United States Patent
Purves et al.

(10) Patent No.: US 10,112,510 B2
(45) Date of Patent: Oct. 30, 2018

(54) LOCKABLE ARMREST

(71) Applicant: WINDSOR MACHINE AND STAMPING (2009) LTD., Windsor (CA)

(72) Inventors: Robert Purves, Windsor (CA); Evan Kayahara, Windsor (CA); Mark Leonard Little, Maidstone (CA)

(73) Assignee: WINDSOR MACHINE AND STAMPING (2009) LTD., Windsor (CA)

( * ) Notice: Subject to any disclaimer, the term of this patent is extended or adjusted under 35 U.S.C. 154(b) by 65 days.

(21) Appl. No.: 15/283,935

(22) Filed: Oct. 3, 2016

(65) Prior Publication Data
US 2017/0101036 A1 Apr. 13, 2017

Related U.S. Application Data

(60) Provisional application No. 62/240,898, filed on Oct. 13, 2015.

(51) Int. Cl.
| | | |
|---|---|---|
| *B60N 2/42* | (2006.01) | |
| *B60N 3/10* | (2006.01) | |
| *B60N 2/433* | (2006.01) | |
| *B60N 2/75* | (2018.01) | |

(52) U.S. Cl.
CPC ............ *B60N 2/4249* (2013.01); *B60N 2/433* (2013.01); *B60N 2/753* (2018.02); *B60N 3/102* (2013.01)

(58) Field of Classification Search
CPC .... B60N 2/4249; B60N 2/4606; B60N 3/102; B60N 2/433
See application file for complete search history.

(56) References Cited

U.S. PATENT DOCUMENTS

| | | | | | |
|---|---|---|---|---|---|
| 2,732,003 | A | * | 1/1956 | Williams ................. | B60N 2/20 244/122 R |
| 2,737,229 | A | * | 3/1956 | Semar .................. | B60N 2/0825 244/122 R |
| 2,864,432 | A | * | 12/1958 | Limberg .............. | B60N 2/0825 297/378.11 |
| 2,873,794 | A | * | 2/1959 | Leslie ...................... | B60N 2/20 297/378.11 |

(Continued)

FOREIGN PATENT DOCUMENTS

| | | |
|---|---|---|
| EP | 1375794 A2 | 1/2004 |
| JP | H05069771 | 3/1993 |
| KR | 20020075041 A | 10/2002 |

OTHER PUBLICATIONS

Search Report regarding related EP App. No. 16 19 3446; dated May 30, 2017; 5 pgs.

*Primary Examiner* — James M Ference
(74) *Attorney, Agent, or Firm* — Cantor Colburn LLP

(57) ABSTRACT

A lockable armrest includes a main body. The lockable armrest also includes a latch assembly operatively coupled to the main body. The latch assembly includes a latch coupled to the main body with a spring resisting movement of the latch during acceleration events below a predetermined acceleration threshold. The latch assembly also includes a locking member operatively coupled to the main body, the latch moveable into engagement with the locking member in response to an acceleration event greater than the predetermined acceleration threshold to lock the lockable armrest in a stowed condition.

6 Claims, 5 Drawing Sheets

(56) References Cited

U.S. PATENT DOCUMENTS

| | | | | |
|---|---|---|---|---|
| 3,400,962 A * | 9/1968 | Martens | ............... | E05B 77/06 292/216 |
| 4,135,759 A * | 1/1979 | Bott | ............... | B60N 2/466 108/137 |
| 4,435,011 A * | 3/1984 | Hakamata | ............... | B60N 2/4613 297/113 |
| 4,579,384 A * | 4/1986 | Sharod | ............... | B60N 2/4606 297/113 |
| 5,100,202 A * | 3/1992 | Hughes | ............... | B60N 2/433 297/378.11 |
| 5,425,568 A * | 6/1995 | Sliney | ............... | B60N 2/22 297/359 |
| 5,476,307 A * | 12/1995 | Whalen | ............... | B60N 2/433 297/378.11 |
| 5,489,143 A * | 2/1996 | Adachi | ............... | B60N 2/4633 297/411.32 |
| 5,540,479 A * | 7/1996 | Thomas | ............... | B60N 2/4613 297/113 |
| 5,556,159 A * | 9/1996 | Canteleux | ............... | B60N 2/16 297/216.1 |
| 5,658,043 A * | 8/1997 | Davidson | ............... | B60N 2/4606 297/113 |
| 5,842,744 A * | 12/1998 | Harmon | ............... | B60N 2/3084 297/378.11 |
| 5,873,633 A * | 2/1999 | Lang | ............... | B60N 2/3084 297/411.2 |
| 6,010,193 A * | 1/2000 | Hara | ............... | B60N 2/4646 248/298.1 |
| 6,568,743 B1 * | 5/2003 | Jayasuriya | ............... | B60N 2/42727 296/153 |
| 6,802,550 B1 * | 10/2004 | Griggs, Jr. | ............... | B60N 2/4686 292/136 |
| 6,843,528 B2 * | 1/2005 | Glynn | ............... | B60N 2/4606 297/188.01 |
| 7,607,702 B2 * | 10/2009 | Pereverzev | ............... | E05B 77/06 292/201 |
| 7,857,393 B2 * | 12/2010 | Cebula | ............... | B60N 2/4633 297/115 |
| 8,429,795 B2 * | 4/2013 | Huachun | ............... | A47C 17/162 16/321 |
| 8,556,339 B2 * | 10/2013 | DeVoe | ............... | B60N 2/4606 292/252 |
| 8,702,174 B2 * | 4/2014 | Pacolt | ............... | B60N 2/4633 297/411.38 |
| 8,876,212 B2 * | 11/2014 | Yamada | ............... | B60N 2/02 297/367 P |
| 9,016,793 B2 * | 4/2015 | Roeglin | ............... | B60N 2/4606 297/411.32 |
| 2003/0197392 A1 * | 10/2003 | Clark | ............... | B60N 2/4686 296/24.34 |
| 2004/0046400 A1 * | 3/2004 | Drysdale | ............... | E05B 77/06 292/216 |
| 2005/0029854 A1 * | 2/2005 | Hann | ............... | B60N 2/4606 297/411.2 |
| 2006/0290160 A1 * | 12/2006 | Tencer | ............... | B60N 2/062 296/68.1 |
| 2007/0262632 A1 * | 11/2007 | Cody | ............... | B60N 2/4646 297/411.35 |
| 2009/0152886 A1 * | 6/2009 | Lee | ............... | B60N 2/4686 296/37.8 |
| 2010/0066113 A1 * | 3/2010 | Browne | ............... | B60N 2/4646 296/24.34 |
| 2010/0283268 A1 * | 11/2010 | Cumbo | ............... | E05B 77/06 292/196 |
| 2013/0147251 A1 * | 6/2013 | Charles | ............... | B29C 69/00 297/411.38 |
| 2014/0125107 A1 * | 5/2014 | Cha | ............... | B60N 2/4613 297/411.3 |
| 2014/0319868 A1 * | 10/2014 | von Rothkirch und Panthen ....... B60N 2/4633 296/24.34 |
| 2015/0091318 A1 * | 4/2015 | Bohner | ............... | B60N 2/4633 296/1.09 |
| 2017/0101036 A1 * | 4/2017 | Purves | ............... | B60N 2/4249 |

* cited by examiner

LOCKABLE ARMREST

CROSS-REFERENCE TO RELATED APPLICATION

This patent application claims priority to U.S. Provisional Application No. 62/240,898, filed Oct. 13, 2015, which is incorporated herein by reference in its entirety.

FIELD OF THE INVENTION

The invention relates to armrest assemblies and, more particularly, to a lockable armrest capable of locking and resisting deployment during an acceleration event.

SUMMARY OF THE INVENTION

In one aspect of the disclosure, a lockable armrest includes a main body. The lockable armrest also includes a latch assembly operatively coupled to the main body. The latch assembly includes a latch coupled to the main body with a spring resisting movement of the latch during acceleration events below a predetermined acceleration threshold. The latch assembly also includes a locking member operatively coupled to the main body, the latch moveable into engagement with the locking member in response to an acceleration event greater than the predetermined acceleration threshold to lock the lockable armrest in a stowed condition.

In another aspect of the disclosure, a lockable armrest includes a main body. The lockable armrest also includes a detent arrangement comprising at least one detent configured to resist movement of the lockable armrest, the detent arrangement comprising a first detent and a second detent, each of the detents having a hook portion engaged with pivoting portions of the lockable armrest to resist movement below a predetermined acceleration threshold.

In yet another aspect of the invention, a lockable armrest includes a main body. The lockable armrest also includes a latch assembly operatively coupled to the main body, the latch assembly resisting movement of the lockable armrest below a predetermined acceleration threshold and locking the lockable armrest in a stowed condition in response to an acceleration event greater than the predetermined threshold. The lockable armrest further includes a detent arrangement comprising at least one detent configured to resist movement of the lockable armrest, the detent arrangement comprising a first detent and a second detent, each of the detents having a hook portion engaged with pivoting portions of the lockable armrest to resist movement.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
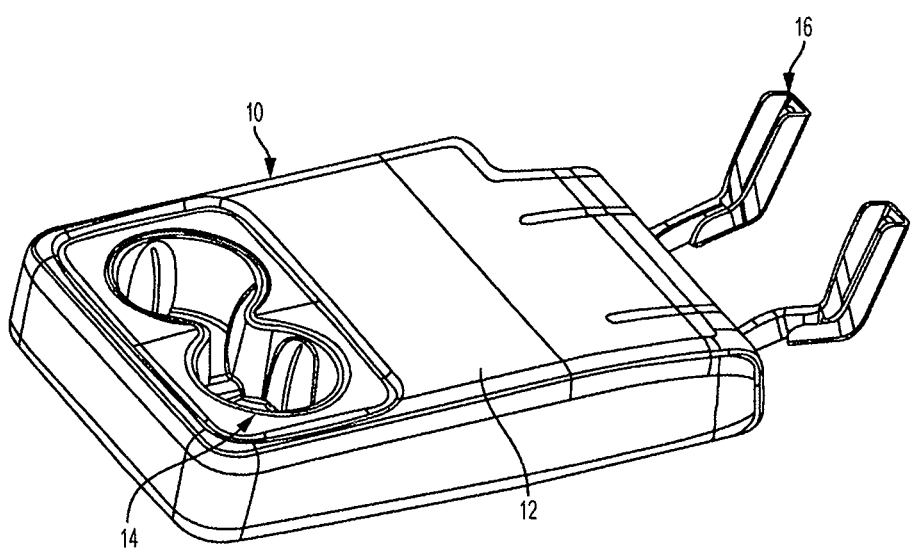
FIG. 1 is a perspective view of a lockable armrest.

Referring to FIG. 1, a lockable armrest is illustrated and generally referenced with numeral 10. The lockable armrest 10 may be disposed in numerous environments and applications, such as in a vehicle, for example. In some embodiments, the lockable armrest 10 is located proximate a rear seat row or region of an automobile. However, it is to be appreciated that the examples are merely illustrative and are not intended to be limiting. The lockable armrest 10 is shown with a cover 12 that may be any type of suitable material, such as cloth or leather, for example. A cutout portion of the cover 12 exposes a cup holder 14 in some embodiments. A detent arrangement 16, which will be described in detail below, is illustrated and protrudes from an edge of the lockable armrest 10.

Figure 2:
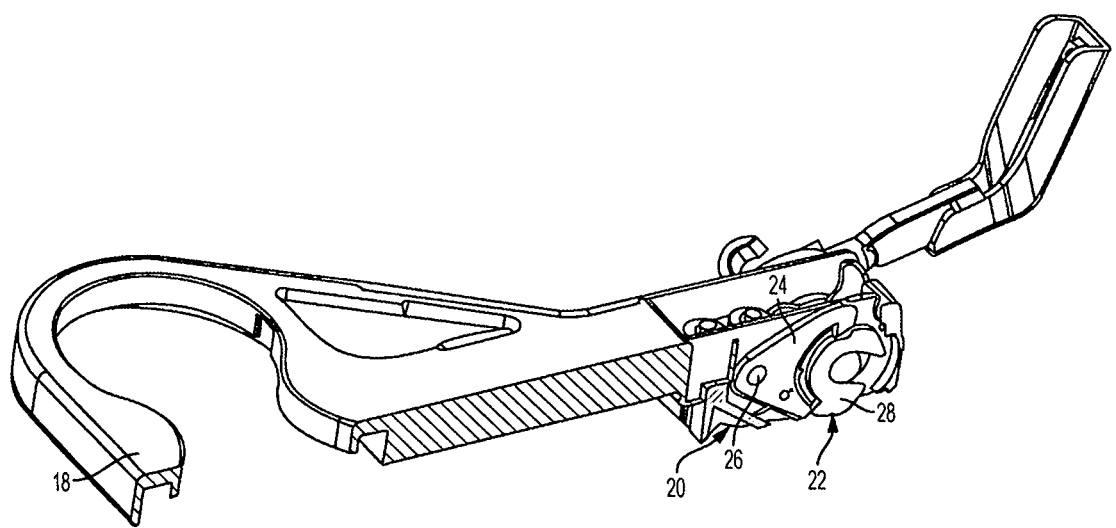
FIG. 2 is a cross-sectional view of the lockable armrest.
Figure 3:
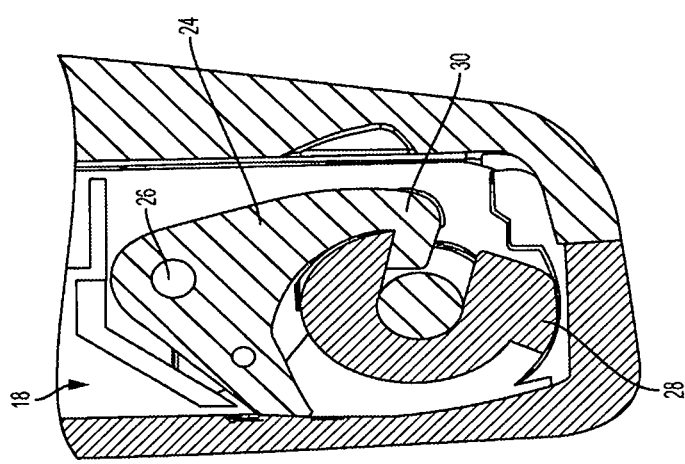
FIG. 3 is a perspective view of a latch assembly of the lockable armrest.

Referring now to FIGS. 2 and 3, the cover 12 of the lockable armrest 10 is removed to expose a cross-sectional view of interior regions of the lockable armrest 10. A cup holder base 18 extends from, and is operatively coupled to, a main body 20 of the lockable armrest 10. Operatively coupled to the main body 20 is a latch assembly 22. The latch assembly 22 includes an inertia latch 24 that is coupled to an inertia spring 26. The inertia spring 26 biases the inertia latch 24 in a rotational manner to keep the inertia latch 24 disengaged from a locking member 28 that is operatively coupled to the main body 20. In the disengaged position, the latch assembly 22 does not prevent the lockable armrest 10 from deploying.

Deployment of the lockable armrest 10 refers to manipulation, such as via rotation, of the lockable armrest 10 from a substantially upright position to a substantially horizontal position. In the substantially upright position, the lockable armrest 10 is stowed in a manner that does not interfere with seating space of the vehicle, in such applications. Conversely, in the substantially horizontal position, the lockable armrest 10 extends into the seating space to provide one or more utility, such as a resting surface for an arm or beverage in the cup holder 14.

When in the substantially upright position (e.g., stowed), it is desirable to easily maneuver the lockable armrest 10 from such position to the deployed position, as needed. However, it is also desirable to prevent the lockable armrest 10 from rapidly deploying during an acceleration event, such as during a vehicle collision. To prevent rapid deployment in such situations, the latch assembly 22 is configured to transition to a locked condition when there is an event where the acceleration (e.g., related to force of impact) is greater than what the inertia spring 26 is designed to resist. In particular, the inertia latch 24 rotates into engagement with the locking member 28 when the acceleration exceeds a predetermined acceleration that the inertia spring 26 is designed to resist. The engaged condition is illustrated in FIG. 3. As shown, an engagement portion 30 of the inertia latch 24 surrounds a portion of the locking member 28 while a portion of the inertia latch 24 surrounds a portion of the locking member 28 in the engaged position. In this position, the lockable armrest is latched and cannot deploy.

In determining the spring's resistance to movement of the inertia latch 24, the inertia latch's mass and the spring force of the inertia spring 26 are variables. In some embodiments, the acceleration to be resisted is up to 4 g (4.0 times the acceleration of Earth's gravity), however, it is to be understood that the particular acceleration will depend upon the particular application of use. The angular rotation of the inertia latch 24 required to enter the engaged (i.e., locked) condition of the latch assembly 22 will also depend upon the particular application. In some embodiments, the angular rotation ranges from about 12 degrees to about 13 degrees.

Figure 4:
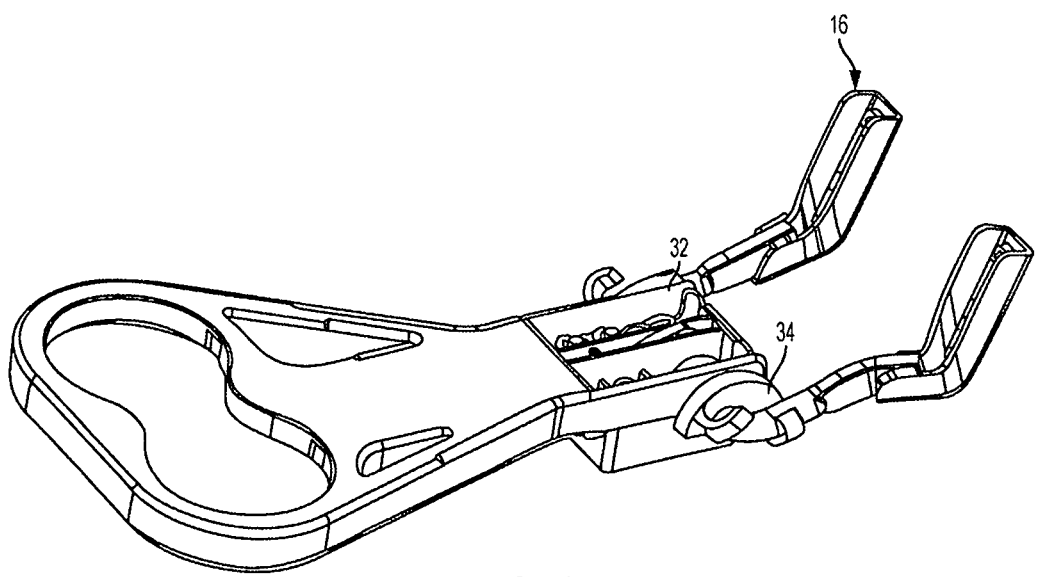
FIG. 4 is a perspective view of an interior portion of the lockable armrest.
Figure 5:
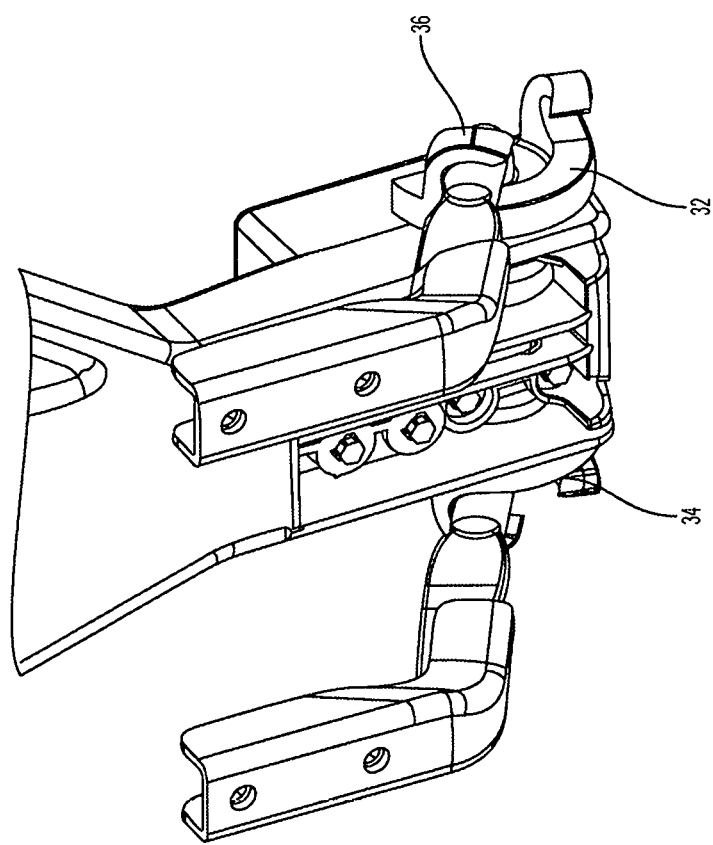
FIG. 5 is a perspective view of a detent arrangement of the lockable armrest.

Referring now to FIGS. 4 and 5, the detent arrangement 16 is illustrated in greater detail. In the illustrated embodiment, the detent arrangement 16 includes two detents, particularly a first detent 32 and a second detent 34. The detents 32, 34 control the lockable armrest's rotational efforts. More particularly, when deploying the lockable armrest, the detents 32, 34 prevent the lockable armrest 10 from falling under its own weight due to gravity. A hook portion 36 of each detent 32, 34 retains the armrest 10 in both the deployed and stowed conditions. For example, when in the deployed state with an open drink in the cup holder 14, the vehicle may encounter a bump in the road when travelling at a moderate speed. The detents 32, 34 are configured to prevent the armrest 10 from rotating (e.g., "skipping"), thereby preventing spillage of the beverage. Conversely, when the armrest 10 is in the stowed condition, the detents 32, 34 will retain the armrest 10 in this position up to 4 g (4.0 times the acceleration of Earth's gravity).

Advantageously, the lockable armrest 10 allows for desired manual manipulation of the armrest 10, but self-locks via the latch assembly 22 during an acceleration event over a predetermined acceleration. Additionally, the lockable armrest 10 is maintained in the deployed or stowed condition with the detent arrangement 16 to prevent inadvertent movement of the lockable armrest 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A lockable armrest disposed in a vehicle, the lockable armrest comprising:
    a main body; and
    a latch assembly operatively coupled to the main body, the latch assembly comprising:
        an inertia latch coupled to the main body with a spring resisting rotational movement of the inertia latch during acceleration events below a predetermined acceleration threshold in response to deceleration of the vehicle; and
        a locking member operatively coupled to the main body, the inertia latch moveable into engagement with the locking member in response to an acceleration event greater than the predetermined acceleration threshold in response to deceleration of the vehicle to lock the lockable armrest in a stowed condition, the inertia latch spring biased to be disengaged from the locking member.

2. The lockable armrest of claim 1, further comprising a detent arrangement comprising at least one detent configured to resist movement of the lockable armrest.

3. The lockable armrest of claim 2, wherein the at least one detent comprises a first detent and a second detent, each of the detents having a hook portion engaged with pivoting portions of the lockable armrest to resist movement.

4. The lockable armrest of claim 1, wherein the inertia latch is engageable with the locking member within 15 degrees of rotation from the stowed position of the lockable armrest.

5. The lockable armrest of claim 1, wherein the predetermined acceleration threshold is greater than 4.0 times the acceleration of Earth's gravity.

6. The lockable armrest of claim 1, wherein the lockable armrest is disposed in a second or third row of the vehicle.

* * * * *